Sheet 2. 2 Sheets.

L. F. Parker
Grain Binder
Nº 94436. Patented Aug. 31. 1869.

Witnesses:

Inventor.
L. F. Parker

UNITED STATES PATENT OFFICE.

L. F. PARKER, OF DAVENPORT, IOWA.

IMPROVEMENT IN GRAIN-BINDERS.

Specification forming part of Letters Patent No. 94,436, dated August 31, 1869.

*To all whom it may concern:*

Be it known that I, L. F. PARKER, of the city of Davenport, in the county of Scott and State of Iowa, have invented a new and useful Machine for Binding Grain with Twine; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel method of binding grain with twine as it comes in gavels from the platform of a harvester before it falls to the ground, more particularly to bind grain as raked to it by rake on my harvester patented December 1, 1868.

Figure 1:
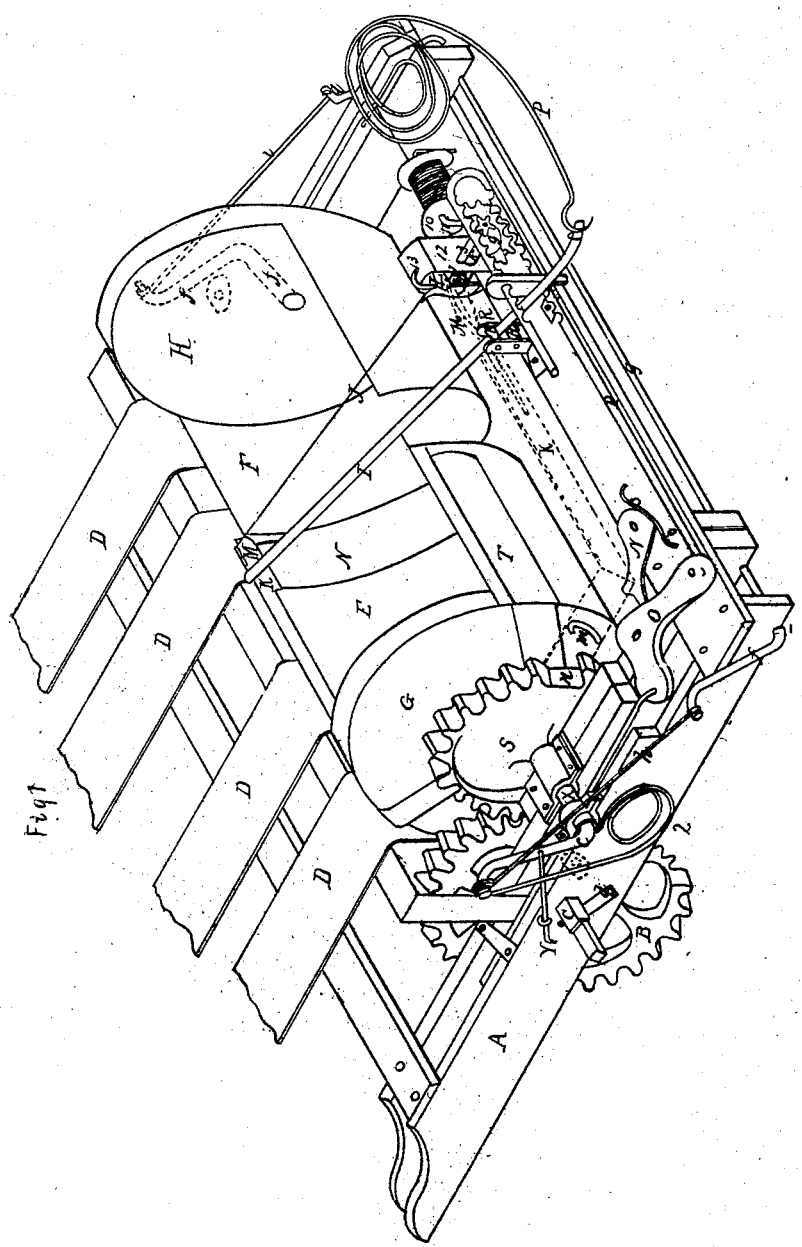
Figure 2:
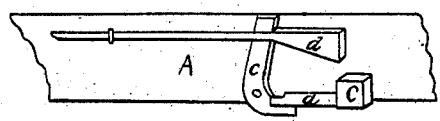
Figure 3:
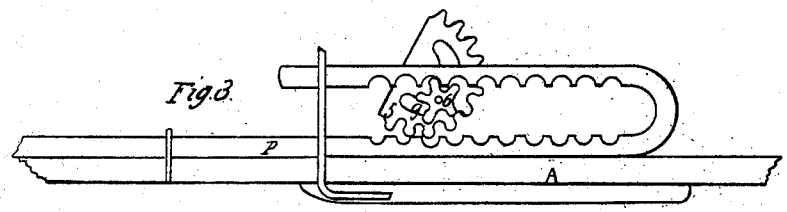
Figures 4, 5:
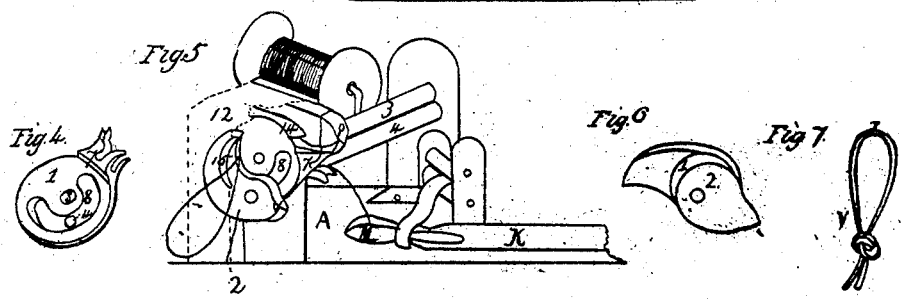
Figure 6:
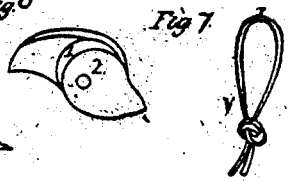
Figure 7:
Figure 8:
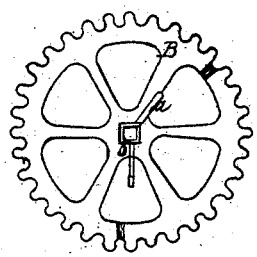
Figure 9:
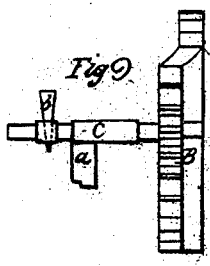

Figure 1 is a perspective view of my machine. Fig. 2 is a view of section of rolling shaft to irregular spur-wheel, with lever-rod and rock lever driving knot-tying machinery. Fig. 3 is section of knot-tying machinery, comprising pinion and cog-lever that drive it; Fig. 4, a perspective view of circle on knot-tier and its projections and slot; Fig. 5, perspective view of knot-tier and pinchers on arm; Fig. 6, perspective view of looper, showing side next to circle with groove; Fig. 7, knot as tied in twine when passed around gavel of grain; Fig. 8, irregular spur-wheel, side view; Fig. 9, vertical view of irregular spur-wheel and its rolling shaft with levers attached.

In constructing my machine I make a rectangular frame, A, with width corresponding to size of gavel, and length corresponding to width of platform on harvester and length of grain to be bound, and place it in position to platform D, so that it shall receive the grain as raked from it. One end will be supported by finger-bar, while the other is in such position that the irregular spur-wheel B shall be actuated by pinion on shaft, and may, if on my harvester, Patent No. 84,507, drive the rake that brings gavel of grain to binder. On this frame the binder rests. The gavel is received into double concaves E and F, having cylinder-heads G and H, when immediately compressing-strap I and twine J are passed around it by means of arm K. The compressing-strap I is permanently, though loosely, attached around arm K at sufficient distance from its end not to come in contact with knot-tier. The twine J is taken up from holder L by means of pinchers M on end of arm K, said pinchers M being opened by holder L, it being wedge-shaped, and catching twine as they leave it, twine J projecting out of hole at top of holder L. When arm K has carried strap I and twine J around gavel, so that pinchers M are again immediately below holder L, it stops and falls back onto spring-stop N, as seen in red lines on Fig. 1, which stop it has moved back in passing up by it, until the knot is tied and twine cut off.

The spring-stop is moved out of track of arm k by rock-lever O just as knot is tied and arm falls back. Concaves E and F at the same time are carried back by force of lever b, on shaft C of irregular wheel B, acting upon rod Y, that upon crank e and its shaft to cylinder G, and by pitman h to crank f on shaft g to crank f, and pitman i to crank f, and its shaft to concave H, thus causing both concaves to revolve back about one-third revolution, and leaving an unobstructed passage for sheaf to ground, carried by its own weight and force of strap I, and its spring P drawing around it. The concaves are immediately brought back to place by action, first, of their own weight, shaft being out of center; second, by force of spring Q in reverse of action of rod Y. The arm k is carried back to or near its starting-point, first, by the force of spring P on strap pulling through between rollers R; second, by spring m on cylinder-head G, which it can slide over in advancing, but not pass back of. The machine is then ready to receive another gavel, when the same process is continued.

The driving machinery consists of small pinion on driving-shaft of harvester, of width, on length of cogs, sufficient to mesh into the two sections of irregular spur-wheel B, which it actuates without changing its line, causing said irregular spur-wheel B to make regular revolutions when harvester is in motion and it is in gear. This spur-wheel B may be of any desirable size and number of cogs, according to size of pinion on driving-shaft and spur-wheel S, in which it meshes; but each of its revolutions must perform the binding process and bring concaves to place at proper time to take up a proper-sized gavel. It has a line of cogs on about two-thirds of its periphery that mesh into the same number of cogs, less one left out on the periphery of spur-wheel S, to which arm K is attached. The remaining part of periphery of irregular spur-wheel B has cogs out of line with cogs that mesh in spur-wheel S, as will more fully appear in Fig. 8 and Fig. 9, to permit its being driven regularly. Spur-wheel S, to which arm K is attached permanently, has same number of cogs on its periphery as are on section of irregular spur-wheel B, that meshes into it, less one, which is left out, and in its space a blank, n. This opening n receives the first two cogs on section of irregular spur-wheel B. Spur-wheel S makes a little over one revolution, carrying arm K up to twine-holder L. When it stops revolving the arm K falls on spring-stops N, as shown by dotted lines on Fig. 1, till knot is tied, when, being now free, it revolves back to allow sheaf to fall, but is drawn to or near place on stop by strap I and spring m on concave G, the vacant space n permitting it to be taken up if not quite to its place. Rolling-shaft C (see Fig. 9) drives the knot-tier, Fig. 5, by means of lever a acting upon rod d directly, to carry it in one direction, and on rock-lever c, (see Fig. 2,) to cause the reverse motion. It also causes the concaves E and F to revolve, to eject sheaf by action of lever b against end of rod Y, and cranks, pitmen, and shafts, attached to rod d, move, as acted upon, by lever a on roller-shaft C, rock-lever O, and by it sliding rack p forward and back, to tie knot. Rod Y moves crank e and shaft to concave E, and also, by pitman h, crank f, shaft g, crank q, pitman i, and crank f and shaft to concave F, all to eject sheaf when bound.

Spur-wheel S has arm K attached to it. It also has a hollow rolling-shaft, X, permanently attached. Shaft of crank e on cylinder-head G passes through shaft X longitudinally, loosely. The cranks on concaves are prevented from turning back by stops o, under them. The strap I serves to compress the sheaf, and has one end attached to arm K, as described, the other to spring P, which causes, when drawn out, the pressure. The support T sustains concave E when gavel is pressed against it.

A modification of this machine may be to have the twine carried by pinchers on a second arm at the opposite end, revolving around concave F and cylinder-head H, the same as arm K now does around concave E, and actuated by machinery in the same way, so as to be carried by connecting-shaft and pinions from spur-wheel S. Springs may be added to carry gavel over the opening between platform-straps D and concaves, if desired.

The knot-tier is composed of a circle, 1, having two projecting points, 7, on its periphery, with a depression between them, with disk presented to concaves E and F near center opening between them. This circle is on rolling shaft 3, running back to pinion 5 on its end, which, being moved by sliding rack p, causes the circle 1 to revolve vertically, alternately forward and back from about one-third to one-half a revolution. The circle 1 is perforated by a semicircular slot, 8, near its shaft to allow it to move unobstructed by shaft 4, which passes through it. The pinion 5 on reverse end of shaft 3 is alike perforated by slot 9 for shaft 4, which also passes through it. Circle 1 has a groove in its periphery about one-half its circuit, where cutter rests, terminating in the slot or opening in the projecting points, where twine is cut by being brought against cutter 14. At the point on circle where points 7 project outward, and a little below the depression between them, this part of the circle with the points projects beyond the face of the circle 1 toward the concaves sufficient to allow point of looper 2 to pass under or back of twine resting over depression between projecting points 7. (See Figs. 4 and 5.) The looper 2 (see Figs. 5 and 6) is on rolling-shaft 4, just below shaft 3 of circle 1, at that end passing through slot 8 in circle 1, at the reverse end passing through slot 9, in pinion 5 on circle-shaft 3, to pinion 6 on itself, which, when carried by line of cogs on sliding rack p, meshing into its top, revolves. This pinion 6 is less than one-half size of pinion 5 on shaft of circle 1. Thus the motion of sliding rack p causes it to revolve about once around while the pinion 5 revolves less than one-half circuit in a reverse direction, as it meshes into a line of cogs at its bottom. Looper 2 rests on face of circle 1, its hook projecting outside of and below points 7 on circle 1 when both are near bottom of vertical circuit. When both pass each other at or near top of vertical circle, it only reaches to forward projection on face of circle 1 below depression between points 7 on periphery. The inside of looper 2 next to circle 1, near shaft 4, is grooved to conduct twine, groove running from under hook to a point nearly opposite, when it runs out on the face of looper 2. The hook of looper 2 sits out from face of circle 1, except at its point, far enough to allow passage of double binding-twine around in groove. On its outer face it has a spring, 15, under which ends of twine pass when point runs under twine. This spring is of such elasticity as to hold double twine, while the loop is formed at the same time, that it opens by pressure of twine less easily than twine is drawn from holder and pinchers on arm.

Guard 12 around knot-tier serves to protect it from grain; also, as support to concave F when gavel is pressed against its side. Cutter 14 is stationary on guard 12, and rests in prepared groove in circle, and cuts twine when pressed against it by movement of circle 1. Spool 10 holds twine, the end passing from it to and through twine-holder L. Twine is held at proper tension by spring 11, or its equivalent.

The manner of operating knot-tier is as follows: The pinchers M on arm take up end of twine from holder L, and carry it around gavel of grain, when arm K reaches opposite side of concave, as shown on Fig. 1, the twine being drawn taut over circle in depression between points 7, lever on rolling shaft on irregular spur-wheel B; then, by rod d and connecting machinery, pushes sliding rack p forward, causing the circle 1 to revolve vertically to the left till it carries twine down past the hook on looper 2, vertically revolving in an opposite direction, and to a point at which it will receive the other end of twine between points as the arm comes up. The reverse motion is then applied to sliding rack p, and the circle 1 and looper 2 are carried in opposite directions back to first position, the circle 1 still carrying the twine, now double, between its points 7. The looper-hook revolving in an opposite direction, projecting, as it does, below points 7 on circle 1, takes the twine nearer the gavel, and winds it in groove around itself. Passing back of hook, it follows groove to face of looper 2. The hook on looper 2 meets the twine held between points 7 before the circle arrives at its destination, and, passing its point under it, takes it under the spring on its face, and passes on till the hook is pointed down. The circle 1 passes on till it carries the twine between its points, against cutter 14, and it is severed. This leaves the ends under spring on hook, and the loop around in looper-groove is drawn loose, and passes over the ends held by spring. The sheaf, now falling, draws the twine into knot.

The knot tied is a square or hard knot, as seen in Fig. 9, and is tied with the two ends lying parallel, as they lead away from gavel when twine is passed around it.

Such tension as may be desired may be given to twine by spring 11 against spool 10, or by passing it around grooved wheel between spool and twine-holder, or spring against twine.

If desired to give too great depth to concaves G and H, to give the return twine J the right angle to carry it into depression between projecting points 7, it may be forced between them by a rod for that purpose, moved by arm K, as it comes up, or by first motion of knot-tier. Knot-tier must be made with grooves and openings proportioned to twine. The length of hook on looper 2, and size of its grooved part, as shown on Fig. 6, in a great measure regulate the amount of slack required to tie knot, and the location of knot as between ends and gavel. A brush or other contrivance may be placed on guard 12, so that it shall retain twine in groove on looper 2 until ends have been taken by spring on hook; then having been pressed by the brush the twine is loose.

Having thus fully described my invention, what I claim as new is—

1. The irregular spur-wheel B, constructed and operating substantially as and for the purposes described.

2. Spur-wheel S, constructed substantially as described, in combination with spur-wheel B, for purposes set forth.

3. Hollow rolling-shaft X, of spur-wheel S, when used for passage of vibrating shaft of grain-holding concave E.

4. The shaft C, provided with arms a and b, operating substantially as and for the purposes described.

5. The vibrating concaves E and F, substantially as and for the purposes described.

6. Support T for vibrating concave E, operating substantially as and for the purpose set forth.

7. Shaft C, arm b, rod Y, crank e, pitman h, cranks s, f, and q on shaft g, pitman i, crank f, and spring Q, or their equivalents, arranged substantially as and for the purposes described.

8. Arm K revolving around concave E, substantially as and for the purposes described.

9. Spring P and strap 1, when attached permanently to revolving arm K, or their equivalent, when used for clamping grain for binding, substantially as described.

10. Stop N and spring s, or their equivalent, when used to sustain arm on binder, substantially as described.

11. Guard 12, or its equivalent, over knot-tier, to protect it from concave F and grain.

12. The twine-holding nipple I, spool 10, and tension-spring 11 against its end, when arranged substantially as shown and described.

13. The looper 2, constructed substantially as and for the purposes described.

14. The spring 16 on face of hook on looper 2, or its equivalent, to hold ends of twine while loop is being drawn over them into knot, substantially as described.

15. The circle 1, with outward and forward projecting points 7, to receive and conduct twine, slot 8 for looper 2, shaft 4, vertical groove on its periphery, and slot through projecting points 7, in which to receive cutter 14, and to assist in cutting off twine, substantially as described.

16. The looper 2, rolling shaft 4, and circle 1, rolling shaft 3, arranged and operating substantially as described.

17. Stationary cutter 14, when operating in groove of circle 1, substantially as described.

18. The sliding rack p, when used to actuate knot-tying apparatus by cogs meshing into top and bottom of pinions 5 and 6, and the rod d, rock-lever C, and rock-lever O used to slide rack p forward and back, when combined substantially as described.

L. F. PARKER.

Witnesses:
WILLETT L. CARROLL,
ABNER DAVISON.